United States Patent [19]
Philippi

[11] Patent Number: 5,363,625
[45] Date of Patent: Nov. 15, 1994

[54] MODULAR BUILDING SYSTEM

[76] Inventor: Gerd Philippi, Anton-Bruckner-Strasse 29, D-6632 Saarwellingen, Germany

[21] Appl. No.: 982,875

[22] Filed: Nov. 30, 1992

[51] Int. Cl.⁵ .............................................. E04C 3/00
[52] U.S. Cl. ................... 52/653.2; 52/655.1; 52/656.9; 52/731.2; 403/252; 403/260; 403/264; 403/407.1
[58] Field of Search ................. 52/648.1, 653.1, 653.2, 52/655.1, 656.1–656.6, 656.9, 235, 585, 731.2; 403/231, 252, 260, 264, 258, 407.1

[56] References Cited

U.S. PATENT DOCUMENTS

| 3,147,518 | 9/1964 | Horgan | 52/235 X |
|---|---|---|---|
| 3,437,362 | 4/1969 | Offenbroich | 52/585 X |
| 3,592,493 | 5/1968 | Goose | 403/264 X |
| 3,780,485 | 12/1973 | Matson | 52/585 X |
| 3,816,011 | 6/1974 | Biebuyck et al. | 403/260 X |
| 3,837,128 | 9/1974 | O'Brien | 52/241 |
| 4,116,573 | 9/1978 | Fuchs | 403/264 |
| 4,334,797 | 6/1982 | Wahlin | 403/252 |
| 4,776,557 | 10/1988 | Turner | 403/252 X |
| 5,067,293 | 11/1991 | Reynolds | 52/235 |
| 5,192,145 | 3/1993 | Rixen et al. | 403/252 X |
| 5,219,406 | 6/1993 | Raz | 403/252 X |
| 5,242,239 | 9/1993 | Hosokawa | 403/258 |

FOREIGN PATENT DOCUMENTS

| 388760 | 5/1932 | Belgium . | |
|---|---|---|---|
| 0436869A2 | 7/1991 | European Pat. Off. . | |
| 2267472 | 11/1975 | France . | |
| 2053228 | 5/1972 | Germany | 403/252 |
| 2315380 | 10/1974 | Germany | 403/264 |
| 611117 | 10/1960 | Italy | 403/260 |
| 442870 | 1/1968 | Switzerland | 403/252 |
| 2176217A | 12/1986 | United Kingdom . | |

Primary Examiner—Peter M. Cuomo
Assistant Examiner—Suzanne L. Dino
Attorney, Agent, or Firm—Darby & Darby

[57] ABSTRACT

A modular building system wherein two profiled tubular members are connected to each other by two first cores which are slidably received in one of two elongated channels of one of the members, by two second cores which are received in the two channels at one end of the other member, by two non-circular posts which extend into sockets of first cores, through one wall of the one member and into sockets of the second cores when the one end of the other member is placed against the outer side of the one wall of the one member. First pins are used to secure the first cores to the one member and to the posts in their sockets, second pins are used to secure the second cores to the respective posts, and threaded fasteners are used to secure the second cores to the other member and/or to the posts.

23 Claims, 1 Drawing Sheet

MODULAR BUILDING SYSTEM

BACKGROUND OF THE INVENTION

The invention relates to modular building systems in general, and more particularly to improvements in structural frameworks of the type wherein profiled tubular members can be assembled with panels, windows or analogous parts to form temporary or permanent walls, display fixtures, shelving racks and/or other relatively simple or complex modular systems. The components of the improved structural framework can be made of a lightweight aluminum alloy or another suitable metallic material.

OBJECTS OF THE INVENTION

An object of the invention is to provide a simple and inexpensive but highly versatile structural framework.

Another object of the invention is to provide a structural framework which can be rapidly assembled or dismantled by resorting to simple and readily available tools.

A further object of the invention is to provide novel and improved sturdy and reliable connections between the constituents of the above outlined structural framework.

An additional object of the invention is to provide a structural framework which can embody any desired number of component parts to form a simple, complex, small or large modular building system.

Still another object of the invention is to provide a structural framework whose constituents can be mass produced from a relatively small number of blanks.

A further object of the invention is to provide a novel and improved method of separably connecting profiled tubular members to each other.

SUMMARY OF THE INVENTION

The invention is embodied in a structural framework, particularly for use in lightweight aluminum construction. The improved framework comprises first and second elongated tubular members each having a first wall, second and third walls flanking the first wall and preferably extending substantially at right angles thereto, a first longitudinal internal channel adjacent a first portion of the first wall and the second wall, and a second longitudinal internal channel adjacent a second portion of the first wall and the third wall. The channels can have identical cross-sectional outlines and one of the tubular members has an end face adjacent the third wall of the other member. The framework further comprises two first cores which are snugly and longitudinally movably received in the second channel of the other member; the cores have first sockets which are aligned with passages in the third wall of the other tubular member. The framework also comprises two second cores snugly and longitudinally movably received in the first and second channels of the one member adjacent the end face; the second cores have second sockets each aligned with one of the first sockets and the framework also comprises two coupling posts each having an at least partially circular cross-sectional outline and each non-rotatably extending into one of the first sockets, through one of the passages and into one of the second sockets. The framework further comprises first and second pins each extending through a hole in the first wall of the other tubular member and through a hole of one of the first cores and engaging the respective post, and means for connecting the second cores with the first wall of the one tubular member and with the respective posts.

The tubular members can have identical square or rectangular cross-sectional outlines, and the channels of each tubular member can also have identical square or rectangular cross-sectional outlines.

The two tubular members are or can be normal to each other when the two posts connect the first cores with the respective second cores.

The first and/or the second sockets are or can be complementary to the respective posts, i.e., each post can be a snug fit in the respective first and/or second socket.

Each pin can extend into a hole of the respective post; alternatively, the tip of each pin can bear against the respective post.

The connecting means can comprise third and fourth pins each extending through a hole of one of the second cores and engaging the respective post. The arrangement may be such that each of the third and fourth pins extends into a hole of the respective post or that the tips of the third and fourth pins bear against the respective posts.

In addition to or in lieu of the aforementioned third and fourth pins, the connecting means can comprise threaded fasteners which extend through the first wall of the one tubular member and into tapped bores of the posts and/or into tapped bores of the second cores. Furthermore, the first wall of the one tubular member can be provided with tapped bores for the threaded fasteners. For example, the threaded fasteners of the connecting means can constitute grub screws.

At least some of the pins, posts and/or cores can constitute metallic castings, e.g., steel castings.

At least some of the aforementioned holes can be tapped; it is then advisable to employ threaded pins.

Each of the posts can be provided with at least one longitudinally extending facet, preferably with two parallel facets which are disposed substantially diametrically opposite each other.

The improved framework can further comprise means for fixedly securing the first cores to each other so that the thus connected first cores can be more readily manipulated for insertion into the first or second channel of the other tubular member.

Each tubular member can be provided with an elongated internal web which forms part of the respective first wall and is disposed between the respective first and second channels. Each such first wall can be provided with a longitudinally extending external groove which extends into the respective web. Each of the second and third walls can be provided with a longitudinally extending internal rib and each channel is then disposed between the respective web and the respective rib (of the second or third wall). Each web can be provided with first and second longitudinal recesses which confront the respective first and second channels, and the end portion of each post can non-rotatably extend into the recess confronting the second channel of the other tubular member.

The novel features which are considered as characteristic of the invention are set forth in particular in the appended claims. The improved structural framework itself, however, both as to its construction and the mode of assembling and dismantling the same, together with additional features and advantages thereof, will be best understood upon perusal of the following detailed description of certain presently preferred specific embodiments with reference to the accompanying drawings.

BRIEF DESCRIPTION OF THE DRAWINGS

The single Figure is an exploded perspective view of a structural framework comprising two elongated tubular members which are to be connected to each other in accordance with one embodiment of the present invention, the first cores being shown in one channel of the left-hand member and the second cores being shown in positions preparatory to coupling them with the posts and with the right-hand member.

DESCRIPTION OF PREFERRED EMBODIMENTS

Figure 1:
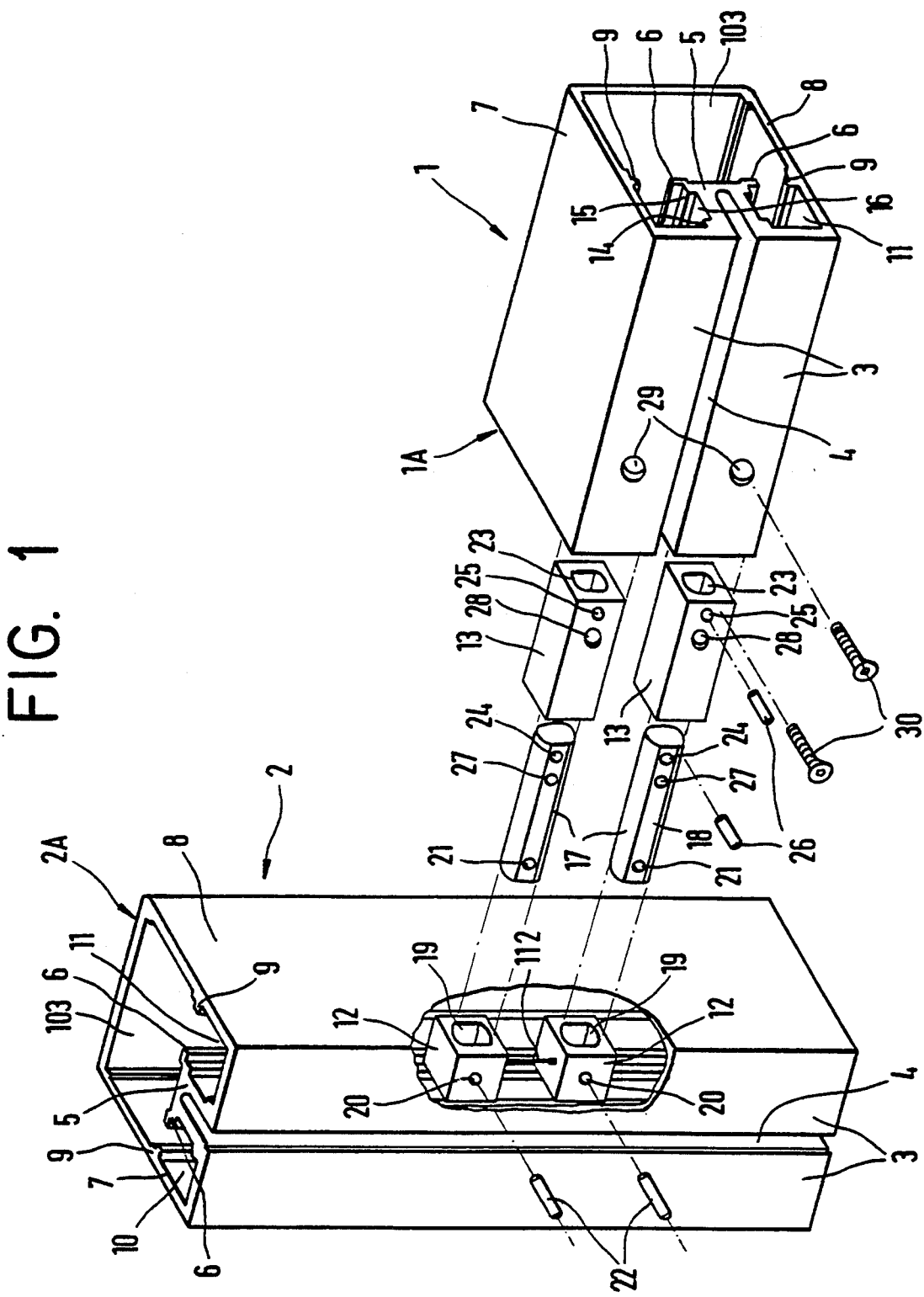

The drawing shows a structural framework which comprises a first elongated tubular member 1 of lightweight aluminum alloy and a preferably identical second elongated tubular member 2. Each of these members has a square or rectangular cross-sectional outline (the Figure shows tubular members having rectangular cross-sectional outlines) and each member has a relatively narrow first wall 3, relatively wide second and third walls 7, 8 which are normal to the first wall 3, and a fourth wall 103 spaced apart from and parallel to the first wall 3. Each first wall 3 has a longitudinally extending internal web 5 disposed between two longitudinally extending internal channels 10 and 11. The channel 10 is inwardly adjacent a first portion (approximately one-half) of the wall 3 and a portion of the wall 7, and the channel 11 is inwardly adjacent a second portion (approximately one-half) of the first wall 3 and a portion of the third wall 8. The walls 7 and 8 have longitudinally extending internal ribs 9 which bound portions of the respective channels 10, 11 and are located opposite the respective ribs 6 of the web 5. Each rib 6 of the web 5 defines with the aligned rib 9 a longitudinally extending clearance in communication with the respective channel 10 or 11. The external surface of the wall 3 is provided with a centrally located longitudinally extending groove 4 which extends inwardly into the web 5, e.g., at least close to the ribs 6.

The grooves 4 can serve for reception of portions of screws or other threaded fasteners (not shown) which can be used to secure to the respective member 1 or 2 one or more window panes. Alternatively, or in addition to receiving portions of threaded fasteners, the grooves 4 can serve for reception of suitable sealing elements, not shown. The fasteners can be driven into the grooves 4 at any selected distance from the ends of the respective tubular members 1 and 2.

The channels 10 and 11 preferably have identical square cross-sectional outlines. The channel 11 of the member 2 receives two spaced apart cores 12 each of which can have a cubical shape. The means for fixedly securing the cores 12 to and for holding them at a selected distance from each other can comprise a connecting device 112 which is indicated by a phantom line. The cores 12 are snugly received in the channel 11 of the member 2 and are longitudinally movable therein prior to being secured to the member 2 in a manner to be described below. Each core 12 has a socket 19 (e.g., a through hole) of non-circular cross-sectional outline in register with a passage (not shown) in the third wall 8 of the member 2. Furthermore, each core 12 has a hole 20 which extends at right angles to the respective socket 19 and is in register with a similar hole (not shown) in the wall 3 of the member 2 to receive a pin 22 serving to preferably separably secure the cores 12 in selected portions of the channel 11. The inner end portions of the pins 22 can further extend into holes 21 which are provided therefor in two elongated posts 17 having first end portions receivable in the sockets 19 of the corresponding cores 12. Such end portions of the posts 17 first extend through the aforementioned passages in the wall 8 of the tubular member 2. The holes 21 can be omitted if the pins 22 are configured in such a way that their tips can be driven against the respective facets or flats 18 of the posts 17. It is also possible to replace the pins 22 with externally threaded pins or screws (e.g., grub screws) which can be caused to pass first through tapped holes of the wall 3 of the member 2, thereupon through tapped holes 20 of the respective cores 12, and finally into tapped holes 21 of the respective posts 17 (or to have their tips bear against the adjacent facets 18 of the corresponding posts). It is often sufficient to provide tapped holes 21 in the posts 17 and have the pins extend through untapped holes of the wall 3 and untapped holes 20 in the respective cores 12. Once the pins 22 (or the externally threaded equivalents thereof) are driven home, the cores 12 are fixedly held in selected portions of the channel 11. A single pin 22 would suffice to maintain the two cores 12 in selected positions within the member 2 (due to the provision of the securing means 112); however, two pins are preferred in order to ensure that each of the two posts 17 is or can be fixedly held in the socket 19 of the respective core 12.

The cores 12 in the channel 11 of the member 2 lie flush against the internal surfaces of the walls 3 and 8. In addition, these cores lie against two shoulders 14, 15 of the web 5 as well as against the respective ribs 6 and 9. The shoulders 14, 15 flank relatively shallow recesses 16 which confront the respective channels 10, 11 and have cross-sectional outlines such that they can non-rotatably receive the very ends of the posts 17 when such posts extend through and beyond the respective sockets 19.

If the tubular member 2 is relatively long, the person in charge of assembling the members 1 and 2 will utilize an elongated rod or another suitable implement to slide the interconnected cores 12 in the channel 11 to a selected location where the holes 20 of the cores 12 are aligned with the holes in the wall 3 so that the pins 22 can be caused to pass through the wall 3 and thereupon into the respective holes 20. The holes in the wall 3 are drilled at desired locations, namely at positions to ensure that the end face 1A of the member 1 will be disposed at a selected distance from the end face 2A of the member 2. The passages in the wall 8 can be drilled or otherwise formed prior or subsequent to insertion of the cores 12; such passages must register with the respective sockets 19 when the cores 12 are moved in the channel 11 to positions in which their holes 20 register with the holes in the wall 3 of the member 2. The passages in the wall 8 are large enough to permit entry of the respective end portions of the posts 17. If the pins 22 are not provided with external threads, they can be dimensioned in such a way that they must be forcibly driven into the respective holes of the wall 3 of the member 2, thereupon through the holes 20 of the cores 12 and ultimately into the holes 21 of the posts 17 or merely against the adjacent facets 18 of such posts.

The posts 17 can be connected to two elongated cores 13 prior to their connection to the cores 12 by the pins 22. The cores 13 are snugly receivable in and slidable into the channels 10, 11 of the tubular member 1; when properly installed therein, the cores 13 are adjacent the end face 1A. Each of the cores 13 has a longitudinally extending socket 23 in the form of a through bore or hole having a non-circular cross-sectional outline preferably shaped in such a way that it can snugly receive a substantial (e.g., major) portion of one of the posts 17. The means for connecting the posts 17 with the respective cores 13 comprises two pins 26 which may but need not be identical with the pins 22 and can extend through transverse holes 25 in the respective cores 13 and thereupon into registering transverse holes 24 of the respective posts 17. The length of each of the pins 26 can be such that their outer ends do not extend outwardly beyond the respective holes 25; this ensures that the cores 13 can be slid into the channels 10, 11 of the tubular member 1 subsequent to their assembly with the posts 17. If desired, the pins 26 can be provided with external threads which then extend into tapped holes 25 and into tapped holes 24. It often suffices to provide only the holes 24 or only the holes 25 with internal threads.

The means for connecting the cores 13 with the member 1 comprises two threaded fasteners 30 (e.g., in the form of grub screws) which extend through tapped or untapped bores or holes 29 in the wall 3 of the member 1, through tapped or untapped bores or holes 28 of the cores 13, and into tapped or untapped bores or holes 27 in the adjacent facets 18 of the posts 17. The pins 26 can be omitted (the same as the holes 25 and 26) if the posts 17 need not be assembled with the cores 13 prior to insertion of the cores 13 into the respective channels 10, 11 of the member 1; the fasteners 30 then serve to connect the cores 13 with the wall 3 of the member 1 as well as with the respective posts 17. The tapped or untapped bores or holes 27 are optional because, if the holes or bores 29 and/or 28 are tapped, the tips of the fasteners 30 can be simply driven against the adjacent facets 18 of the posts 17 to ensure that these posts are held in selected axial positions in the respective sockets 23.

Each of the posts 17 can resemble or constitute an elongated cylindrical stud or pin with two longitudinally extending parallel facets or flats 18 which are or can be disposed diametrically opposite each other.

The diameters of the bores or holes 28 and 29 can exceed the diameters of the bores or holes 24 and 25.

The properly inserted and secured cores 13 can be held in such positions that their exposed end faces are flush with the end face 1A of the member 1. The end face 1A is thereupon moved against the external surface of the wall 8 of the member 2 whereby the exposed portions of the posts 17 (i.e., those portions which project beyond the respective sockets 23) extend through the passages in the wall 8 of the member 2 and into and beyond the sockets 19 of the cores 12 to enter and to be non-rotatably held in the respective shallow recess 16 of the web 5 between the channels 10, 11 of the member 2. The next step involves the introduction of the pins 22 to complete the attachment of the members 1 and 2 to each other.

The improved structural framework is susceptible of numerous additional modifications without departing from the spirit of the invention. For example, the pins 22 can be replaced with threaded fasteners identical with or similar to the fasteners 30. Also, each of the cores 12 can be secured to the member 2 by two or more pins 22 and each of the cores 13 can be secured to the member 1 by two or more fasteners 30. Still further, each of the posts 17 can be affixed to the respective core 13 by two or more pins 26. It is further clear that the cores 12 can be installed in the channel 10 of the member 2 and/or that two additional cores 12 can be installed in the channel 10 of the member 1 in order to facilitate the establishment of a connection between the member 1 and a third tubular member opposite the member 1. Still further, the right-hand end of the channel 10 or 11 in the member 1 can receive two cores 12 to facilitate attachment of one or more tubular members to the member 1, e.g., one at the outer side of the wall 7 and another at the outer side of the wall 8 of the member 1. Analogously, the upper end or the lower end of the member 2 can receive two cores 13 to facilitate the attachment of the member 2 to a further tubular member.

The end face 1A and/or 2A need not be exactly normal to the longitudinal direction of the respective tubular member. This renders it possible to assemble two tubular members in such a way that they are not normal to each other. Furthermore, the cores 12 need not have a cubical shape but can be provided with several pairs of surfaces which need not be normal to each other. The cores 12 and 13 can be obtained by severing an elongated rod at selected intervals to yield relatively short cores 12 and longer cores 13. The same applies for the posts 17, i.e., the dimensions of these posts can be identical so that they can be obtained by severing pieces from an elongated rod having a substantially circular cross-sectional outline with two parallel facets 18. The same holds true for the members 1 and 2. The pins 22 and/or the pins 26 and/or the posts 17 can constitute castings, e.g., steel castings.

An important advantage of the improved structural framework is its simplicity. Thus, when the framework is constructed in a manner as shown in the Figure, it is merely necessary to drill or otherwise provide the members 1, 2 with a total of six bores, holes and/or passages, namely the holes or bores in the wall 3 of the member 2 for the pins 22, the passages in the wall 8 of the member 2 for the posts 17, and the holes or bores 29 in the wall 3 of the member 1 for the fasteners 30. Furthermore, the passages in the wall 8 of the member 2 need not be machined and/or otherwise formed with a high degree of precision; all that counts is to ensure that these passages permit the respective end portions of the posts 17 to pass through them on their way into the sockets 19 of the corresponding cores 12 and thence into the confronting shallow recess 16 of the web 5 at the inner side of the wall 3 of the member 2. The reason is that the exact position of the member 2 relative to the member 1 will be determined by the selected positions of the cores 12, and these cores are held in selected positions by the pins 22 which pass through the holes of the wall 3 of the member 2, not through the wall 7 or 8 or 103.

The posts 17 can be said to establish transitions from the substantially round to the polygonal (square or rectangular) profiles. This happens automatically or necessarily if the cross-sectional outlines of the channels 10, 11 are not intentionally altered, a procedure which would involve a considerable increase in the initial cost of the members 1 and 2. The posts 17 are non-rotatably received only where absolutely necessary or highly advisable, i.e., in the sockets 19 of the cores 12 and in the sockets 23 of the cores 13 (and preferably also in the respective recess 16 of the web 5 in the member 2). The same holds true for the cores 12; they are configurated and dimensioned in such a way that they can be snugly received in a channel 10 or 11 but can be readily shifted in the selected channel 10 or 11 to any desired location, i.e., at a selected distance from the end face 2A. The afore-mentioned rod or another tool which is selected to shift the cores 12 to desired positions in the channel 10 or 11 of the member 2 can be provided with an adjustable ring-shaped or otherwise configured stop which abuts the end face 2A when the cores 12 are moved to optimum positions, i.e., at a selected distance from the end face 2A.

As the mutual spacing of the cores 12 is the same as that of the channels 10, 11 in the member 1 or 2. It is also possible to replace the two cores 12 with a single elongated core, i.e., to omit the securing means 112; one end portion of such elongated core then constitutes an equivalent of one of the cores 12, the other end portion constitutes an equivalent of the other core 12, and the intermediate portion of the elongated core constitutes an equivalent of the securing means 112.

Those portions of the posts 17 which project beyond the respective cores 13 can be said to constitute studs which are introduced into the aligned sockets 19 prior or subsequent to introduction of the cores 13 into the channels 10, 11 of the member 1 and fastening of the cores 13 in this member. As already described hereinbefore, the posts 17 can be connected with the cores 13 before the cores 13 are introduced into the member 1. However, it is equally possible to introduce the cores 13 into the member 1, to introduce the posts 17 into the respective sockets 23, and to thereupon utilize the fasteners 30 as the only means for connecting the cores 13 to the member 1 and to the posts 17.

A further important advantage of the improved structural framework is that the various connecting, fastening and/or coupling means do not detract from the appearance of the finished product. Thus, the pins 26 are fully concealed when the cores 13 are inserted into the member 1, the fasteners 30 can constitute grub screws which are located entirely within the confines of the member 1 when they are received in the bores or holes 29, 28 and 27, and the pins 22 can be driven into the holes of the wall 3 of the member 2 and into the respective holes 20 and 21 to such an extent that their outer ends do not project beyond the outer side of the wall 3 forming part of the member 2. The outer ends of the holes in the wall 3 of the member 2 and of the holes 29 in the wall of the member 1 can be filled with sealing material. The fact that the fasteners, pins and posts are or can be fully concealed does not affect the stability of the connection between the members 1 and 2.

It is equally within the purview of the invention to install and fix the posts 17 first in the sockets 19 of the cores 12, to thereupon introduce the posts 17 into and fix them in the cores 13 and to thereafter introduce the cores 13 into and fix them in the member 1 (or to first introduce the posts 17 into the cores 12, to thereupon introduce the cores 13 into the member 1, and to ultimately introduce the posts 17 into the sockets 23). It is presently preferred to install the posts 19 in the cores 13, to fix the cores 13 in the member 1, and to thereupon introduce the posts 17 into and to fix them in the sockets 19 of the cores 12. In order to ensure that the posts 17 can be readily introduced into the sockets 19 and 23, the cross-sectional outlines of the sockets are preferably complementary to the non-circular cross-sectional outlines of the posts. The utilization of posts 17 having a non-circular cross-sectional outline is desirable on the ground that such posts can be inserted in predetermined angular positions to thus ensure predictable orientation of various interconnected parts relative to each other.

As already mentioned above, the posts 17 can constitute castings, especially steel castings. However, if the holes 21 and/or 24 and/or 27 are to be omitted, i.e., if the tips of the pins 22, 24 and/or threaded fasteners 30 are to merely bear against the adjacent facets 18 of the posts 17, these posts can be made of an aluminum alloy to permit partial penetration of the tips of pins 22 and/or 24 and/or fasteners 30 into the adjacent facets 18.

The illustrated and described configurations of the members 1 and 2 exhibit the advantage that the required quantity of metallic material is reduced to a minimum. The webs 5 constitute partitions between the respective channels 10, 11 and further permit the making of relatively deep grooves 4 for threaded fasteners, sealing elements and the like. The provision of ribs 6 and 9 in lieu of continuous internal walls around the channels 10, 11 also contributes to a reduction of the mass, weight and cost of the tubular members 1 and 2.

The recesses 16 not only contribute to an additional reduction of the weight, mass and cost of the members 1, 2 but they also serve the important function of permitting reliable non-rotatable anchoring of the respective end portions of the posts 17 in the web 5 of the member 2. The width of each recess 16 preferably matches or approximates the distance between the facets 18 of a post 17.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A structural framework comprising first and second elongated tubular members each having a first wall, second and third walls flanking the first wall and at least substantially normal thereto, a first longitudinal internal channel adjacent a first portion of the first wall and the second wall, and a second longitudinal internal channel adjacent a second portion of the first wall and the third wall, said channels having identical cross-sectional outlines and one of said first and second members having an end face adjacent the third wall of the other of said first and second members; two first cores snugly and longitudinally movably received in the second channel of said first member, said cores having first sockets aligned with passages in the third wall of said first member; two second cores snugly and longitudinally movably received in the first and second channels of said second member adjacent said end face, said second cores having second sockets each aligned with one of said first sockets; two coupling posts each having an at least partially circular cross-sectional outline and each extending into one of said first sockets, through one of said passages and into one of said second sockets; first and second pins each extending through a hole in the first wall of said first member and through a hole of one of said first cores and engaging the respective post; and means for connecting said second cores with the respective posts.

2. The framework of claim 1, wherein said first and second members have identical square or rectangular cross-sectional outlines.

3. The framework of claim 1, wherein the channels of each of said first and second members have square or rectangular cross-sectional outlines.

4. The framework of claim 1, wherein said first and second members are normal to each other.

5. The framework of claim 1, wherein said first sockets are complementary to said posts.

6. The framework of claim 1, wherein each of said pins extends into a hole of the respective post.

7. The framework of claim 1, wherein each of said pins has a tip bearing against the respective post.

8. The framework of claim 1, wherein said means for connecting said second cores comprises third and fourth pins each extending through a hole of one of said second cores and engaging the respective post and further means for connecting said second cores with one wall of said second member.

9. The framework of claim 8, wherein each of said third and fourth pins extends into a hole of the respective post.

10. The framework of claim 8, wherein each of said third and fourth pins has a tip bearing against the respective post.

11. The framework of claim 8, wherein said further connecting means comprises threaded fasteners extending through the first wall of said one member and into tapped bores of said posts.

12. The framework of claim 8, wherein said further connecting means comprises threaded fasteners extending through tapped bores of the first wall of said one member.

13. The framework of claim 8, wherein said further connecting means comprises threaded fasteners extending into tapped bores of said second cores.

14. The framework of claim 8, wherein said further connecting means comprises grub screws.

15. The framework of claim 1, wherein at least some of said posts and said cores are metallic castings.

16. The framework of claim 1, wherein at least some of said posts and cores are steel castings.

17. The framework of claim 1, wherein at least some of said holes are tapped.

18. The framework of claim 1, wherein each of said posts has at least one longitudinally extending facet.

19. The framework of claim 1, wherein each of said posts has two longitudinally extending facets disposed substantially diametrically opposite each other.

20. The framework of claim 1, further comprising means for fixedly securing said first cores to each other.

21. The framework of claim 1, wherein each of said first and second members has an elongated internal web forming part of the respective first wall and disposed between the respective first and second channels, each of said first walls having a longitudinally extending external groove extending into the respective web.

22. The framework of claim 1, wherein each of said first walls has a longitudinally extending internal web between the respective first and second channels and each of said second and third walls has a longitudinally extending internal rib, each of said channels being disposed between the respective web and the respective rib.

23. The framework of claim 1, wherein each of said first walls has a longitudinally extending internal web between the respective first and second channels and each of said webs has first and second longitudinal recesses confronting the respective first and second channels, said posts having end portions non-rotatably extending into the recess confronting the second channel of said other member.

* * * * *